US011038842B2

(12) United States Patent
Gerber et al.

(10) Patent No.: US 11,038,842 B2
(45) Date of Patent: Jun. 15, 2021

(54) CLOUD SECURITY STACK (71) Applicant: Walmart Apollo, LLC, Bentonville, AR (US)

(72) Inventors: Christopher John Gerber, Bella Vista, AR (US); Michael David Smith, Rogers, AR (US); Mark Alan Pagan, Bentonville, AR (US); Benjamin Ivy Crawford, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 415 days.

(21) Appl. No.: 15/881,267

(22) Filed: Jan. 26, 2018

(65) Prior Publication Data

US 2018/0212928 A1 Jul. 26, 2018

Related U.S. Application Data (60) Provisional application No. 62/450,814, filed on Jan. 26, 2017.

(51) Int. Cl.
*H04L 29/06* (2006.01)

(52) U.S. Cl.
CPC ...... *H04L 63/0227* (2013.01); *H04L 63/0209* (2013.01); *H04L 63/0236* (2013.01);
(Continued)

(58) Field of Classification Search
CPC .............. H04L 63/0428; H04L 63/105; H04L 63/0209; H04L 63/0227; H04L 63/0236; H04L 63/1425; H04W 4/70
See application file for complete search history.

(56) References Cited

U.S. PATENT DOCUMENTS 7,848,335 B1\* 12/2010 Kang .................. H04L 12/4633
370/401
8,726,341 B2   5/2014 Radhakrishnan
(Continued)

FOREIGN PATENT DOCUMENTS

WO    2012129503 A1    9/2012

OTHER PUBLICATIONS

Maria D. Alvarado • Rajeev Agrawal • Yolanda Baker; Security mechanisms utilized in a secured cloud infrastructure; 2013 Proceedings of IEEE Southeastcon (pp. 1-5); (Year: 2013).*

(Continued)

*Primary Examiner* — Luu T Pham
*Assistant Examiner* — Chao Wang (57) ABSTRACT

Methods and systems for secure cloud provider communication are disclosed. A method may include receiving a request to transmit data from one of a first cloud provider, an entity network, and a second cloud provider to another of the first cloud provider, the entity network, and the second cloud provider. The method may further include determining levels of trust associated with the one of the first cloud provider, the entity network, and the second cloud provider and the another of the first cloud provider, the entity network, and the second cloud provider, wherein the levels of trust are based on endpoint control by the entity network. The method may also include transmitting the data from the one of the first cloud provider, the entity network, and the second cloud provider to a cloud security stack based on the determined levels of trust.

20 Claims, 4 Drawing Sheets

(52) U.S. Cl.
CPC ........ *H04L 63/105* (2013.01); *H04L 63/1425* (2013.01); *H04L 63/0428* (2013.01)

(56) References Cited

U.S. PATENT DOCUMENTS

| | | | |
|---|---|---|---|
| 8,813,205 B2 | 8/2014 | Deshmukh et al. | |
| 8,984,269 B2 | 3/2015 | Ferris | |
| 9,003,502 B2* | 4/2015 | Zhang | G06F 21/31 726/5 |
| 9,075,996 B2 | 7/2015 | Harris et al. | |
| 9,430,642 B2 | 8/2016 | Hepkin et al. | |
| 9,497,184 B2 | 11/2016 | Fork et al. | |
| 2010/0299313 A1 | 11/2010 | Orsini et al. | |
| 2011/0047480 A1* | 2/2011 | Venkataraman | G06F 16/9535 715/748 |
| 2012/0140630 A1* | 6/2012 | McGrath | H04L 63/101 370/235 |
| 2013/0094515 A1* | 4/2013 | Gura | H04L 63/123 370/419 |
| 2013/0205383 A1* | 8/2013 | Deshmukh | H04L 63/0815 726/8 |
| 2014/0096199 A1* | 4/2014 | Dave | G06F 21/604 726/4 |
| 2014/0122873 A1 | 5/2014 | Deutsch et al. | |
| 2014/0123292 A1 | 5/2014 | Schmidt et al. | |
| 2014/0150060 A1 | 5/2014 | Riley | |
| 2014/0304784 A1* | 10/2014 | Harrison | H04L 63/0492 726/5 |
| 2016/0099963 A1 | 4/2016 | Mahaffey et al. | |
| 2016/0277368 A1* | 9/2016 | Narayanaswamy | G06F 21/6218 |
| 2017/0171211 A1* | 6/2017 | Tsurbeleu | G06F 21/10 |
| 2017/0185793 A1* | 6/2017 | Rotem | H04L 63/1441 |
| 2017/0339176 A1* | 11/2017 | Backer | H04L 67/22 |
| 2018/0069834 A1* | 3/2018 | Angelsmark | H04L 63/12 |
| 2018/0176222 A1* | 6/2018 | Bhaskar | H04L 63/0815 |
| 2019/0222597 A1* | 7/2019 | Crabtree | H04L 43/045 |

OTHER PUBLICATIONS

Yeluri, R. • Castro-Leon, E. • Harmon, R.R. • Greene, J.; Building Trust and Compliance in the Cloud for Services; 2012 Annual SRII Global Conference (pp. 379-390); (Year: 2012).*

Stuti Srivastava • Prem Sewak Sudhish; Security in cloud computing systems: A review of challenges and solutions for security in distributed computing environments; 2015 39th National Systems Conference (NSC) (pp. 1-5); (Year: 2015).*

Oasis, "Assertions and Protocls for teh Oasis Security Assertion Markup Language (SAML) V2.0," Oasis Open 2005, Mar. 15, 2005; 86 pages.

International Search Report and Written Opinion for PCT Application No. PCT/US2018/015495, dated Apr. 5, 2018.

IBM "IBM Cloud Direct Link partners," Jul. 9, 2019. https://www.ibm.com/cloud/direct-link/partners.

Amazon, "AWS Cloud Security," Jul. 9, 2019; https://aws.amazon.com/security/.

International Preliminary Report on Patentability in PCT/US2018/015495, dated Aug. 8, 2019; 11 pages.

Office Action in Canadian Patent Application No. 3,051,500, dated Aug. 27, 2020; 4 pages.

* cited by examiner

CLOUD SECURITY STACK

RELATED APPLICATIONS

This application claims the benefit of the earlier filing date of U.S. Provisional Patent Application No. 62/450,814, filed Jan. 26, 2017 and titled "Cloud Security Stack," the entirety of which is incorporated herein by reference.

FIELD OF TECHNOLOGY

The following relates to security for data transmitted to and from a cloud provider, and more specifically to methods and systems for providing security between cloud providers and entities they service.

BACKGROUND

Cloud service providers may provide web hosting, storage, platform as a service (PaaS), infrastructure as a service (IaaS), software as a service (SaaS) and other services to various consumers, which may be entities such as businesses and corporations. The cloud providers may route data to and from the entities, and may even route data to each other in the course of providing such services. In some situations, the entities may need to transmit private data to and from the cloud providers, and the cloud providers may need to route and secure that data. However, the cloud providers may not provide the enhanced security, speed, or interoperability necessary to meet the requirements of their customer entities.

Thus, there may be a need for methods and systems for providing the enhanced security, speed, or interoperability required by the various entities served by cloud providers.

SUMMARY

An aspect of the present disclosure relates to a method for secure cloud provider communication. The method may include receiving a request to transmit data from one of a first cloud provider, an entity network, and a second cloud provider to another of the first cloud provider, the entity network, and the second cloud provider. The method may further include determining levels of trust associated with the first cloud provider, the entity network, and the second cloud provider. Determining the levels of trust may include one or more of electronically transmitting a set of required control criteria to the first cloud provider and the second cloud provider, electronically receiving communications from to the first cloud provider and the second cloud provider, the communications indicating which of the required control criteria are met by the first cloud provider and the second cloud provider, electronically validating that the indicated required control criteria are met by the first cloud provider and the second cloud provider, and comparing the validated required control criteria for the first cloud provider and the second cloud provider with defined required control criteria for three different levels of trust. The method may additionally include designating the first cloud provider as having a first level of trust based on the comparing of the validated required control criteria to the defined required control criteria for the first cloud provider. Moreover, the method may include designating the second cloud provider as having a second level of trust based on the comparing of the validated required control criteria to the defined required control criteria for the second cloud provider. Furthermore, the method may include transmitting the data from the one of the first cloud provider, the entity network, and the second cloud provider to a cloud security stack based on the designated levels of trust. Also, the method may include processing the data at the cloud security stack based on the designated levels of trust, wherein the first cloud provider, the entity network, and the second cloud provider are each designated as having a different level of trust and communicate securely with each other based on the different levels of trust designated and the processing of the data at the cloud security stack.

An aspect of the present disclosure relates to a method for secure cloud provider communication. The method may include receiving a request to transmit data from one of a first cloud provider, an entity network, and a second cloud provider to another of the first cloud provider, the entity network, and the second cloud provider. The method may further include determining or designating levels of trust associated with the one of the first cloud provider, the entity network, and the second cloud provider and the another of the first cloud provider, the entity network, and the second cloud provider, wherein the levels of trust are based on endpoint control by the entity network. The method may also include transmitting the data from the one of the first cloud provider, the entity network, and the second cloud provider to a cloud security stack based on the determined levels of trust. The method may additionally include processing the data at the cloud security stack based on the determined levels of trust.

In various implementations, the method may include transmitting the data from the cloud security stack to the another of the first cloud provider, the entity network, and the second cloud provider based on the processing of the data at the cloud security stack. Processing the data at the cloud security stack based on the determined or designated levels of trust may include inspecting, at a network data loss prevention system of the cloud security stack, the data to identify the data to prevent loss of the data based on defined data loss prevention criteria. Processing the data at the cloud security stack based on the determined or designated levels of trust may also include inspecting, at an intrusion prevention system of the cloud security stack, the data to identify malicious activity based on defined intrusion prevention system criteria. Processing the data at the cloud security stack based on the determined or designated levels of trust may further include capturing, at a packet capture system of the cloud security stack a copy of the data and storing the copy of the data. Processing the data at the cloud security stack based on the determined or designated levels of trust may additionally include determining, at a firewall system of the cloud security stack, whether the data should pass through the cloud security stack based on defined firewall criteria. Moreover, processing the data at the cloud security stack based on the determined or designated levels of trust may include inspecting, at a firewall system of the cloud security stack, the data to ensure adherence to a network traffic protocol.

In various implementations, the levels of trust based on endpoint control by the entity network may include a trusted level. The trusted level may indicate an endpoint under control of the entity network meeting defined control criteria ensuring that the data is completely protected. The levels of trust based on endpoint control by the entity network may further include a semi-trusted level. The semi-trusted level may indicate an endpoint under control of the entity network meeting defined control criteria ensuring that the data is partially protected. The levels of trust based on endpoint control by the entity network may also include an untrusted level. The untrusted level may indicate an endpoint not under control of the entity network based on defined control criteria and indicate that the data unprotected. The cloud security stack may include a router, a switch, a firewall, an intrusion prevention system, a network data loss prevention system, a packet capture system, and a network tap. The first cloud provider and the second cloud provider may service the entity network.

An aspect of the present disclosure relates to s system for secure cloud provider communication. The system may include a cloud security stack to control passage of network traffic between cloud providers servicing an entity network and between the cloud providers and the entity network. The cloud security stack may include a virtual routing and forwarding system to logically separate network traffic originating from trusted, semi-trusted, and untrusted cloud providers. The cloud security stack may also include a network data loss prevention system to inspect the network traffic, identify data, and prevent loss of data based on defined data loss prevention criteria. The cloud security stack may further include an intrusion prevention system to inspect the network traffic and identify malicious activity based on defined intrusion prevention system criteria. The cloud security stack may additionally include a packet capture system to capture and store a copy of the network traffic. Moreover, the cloud security stack may include a firewall system to determine whether the network traffic should pass through the cloud security stack and inspect the network traffic to ensure adherence to a network traffic protocol.

An aspect of the present disclosure relates to a method for determining a level of trust to be assigned to a cloud provider and applying the level of trust using a cloud security stack. The method may include requesting control information from a cloud provider. The control information may be physical parameters indicative endpoint control. The method may further include receiving the control information from the cloud provider. The method may also include comparing, by a processor of a computer system, the physical parameters indicative of endpoint control with defined trust level criteria associated with an entity network. The method may additionally include assigning, by a processor of a computer system, a level of trust to the cloud provider based on the comparing. Moreover, the method may include managing network traffic from the cloud provider at the cloud security stack based on the level of trust assigned to the cloud provider.

An aspect of the present disclosure relates to a computer system, comprising: a processor, at least one input mechanism coupled to the processor, a memory device coupled to the processor, and a computer readable storage device coupled to the processor, wherein the storage device contains program code executable by the processor via the memory device to implement a method for determining a level of trust to be assigned to a cloud provider and applying the level of trust using a cloud security stack. The method may include requesting control information from a cloud provider. The control information may be physical parameters indicative endpoint control. The method may further include receiving the control information from the cloud provider. The method may also include comparing, by a processor of a computer system, the physical parameters indicative of endpoint control with defined trust level criteria associated with an entity network. The method may additionally include assigning, by a processor of a computer system, a level of trust to the cloud provider based on the comparing. Moreover, the method may include managing network traffic from the cloud provider at the cloud security stack based on the level of trust assigned to the cloud provider.

An aspect of the present disclosure relates to a computer program product, comprising a computer readable hardware storage device storing a computer readable program code, the computer readable program code comprising an algorithm that when executed by a computer processor of a computing system implements a method for a method for determining a level of trust to be assigned to a cloud provider and applying the level of trust using a cloud security stack. The method may include requesting control information from a cloud provider. The control information may be physical parameters indicative endpoint control. The method may further include receiving the control information from the cloud provider. The method may also include comparing, by a processor of a computer system, the physical parameters indicative of endpoint control with defined trust level criteria associated with an entity network. The method may additionally include assigning, by a processor of a computer system, a level of trust to the cloud provider based on the comparing. Moreover, the method may include managing network traffic from the cloud provider at the cloud security stack based on the level of trust assigned to the cloud provider.

The foregoing and other features of construction and operation will be more readily understood and fully appreciated from the following detailed disclosure, taken in conjunction with accompanying drawings.

BRIEF DESCRIPTION OF THE DRAWINGS

Some of the embodiments will be described in detail, with reference to the following figures, wherein like designations denote like members, wherein.

DETAILED DESCRIPTION

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

In order to meet various security and data protection requirements, an entity may implement infrastructure and process flow to secure connectivity between the entity and one or more of its cloud providers. The infrastructure and process flow may include a number of systems such as firewalls, intrusion prevention, network visibility, network data loss prevention, network packet capture, and centralized logging. These systems may be included in a system which may be referred to herein as a cloud security stack or cloud security gateway.

The systems and methods described herein may provide for secure cloud connectivity between cloud providers and entities of different levels of trust. Existing systems may not allow for more than two networks (i.e., three or more networks), each with a different defined level of trust, to communicate in a secure manner. Using the cloud security stack and various processes described in the present disclosure, interconnectivity for three or more networks, each having a different defined level of trust, may be achieved.

Further, the systems and methods described herein may provide security mechanisms to preserve a level or standard of security between the cloud providers and the entities. The security mechanisms may be controlled and/or implemented at the cloud security stack or cloud security gateway based on the different levels of trust assigned to the cloud providers and entities. In various implementations, a process may be used for evaluating a cloud provider or entity to determine a level of trust associated with the cloud provider or entity. Further, the process may control how traffic flows between cloud providers and entities having different levels of trust. The levels of trust may include trusted cloud providers or entities, semi-trusted cloud providers or entities and untrusted cloud providers or entities.

Figure 1:
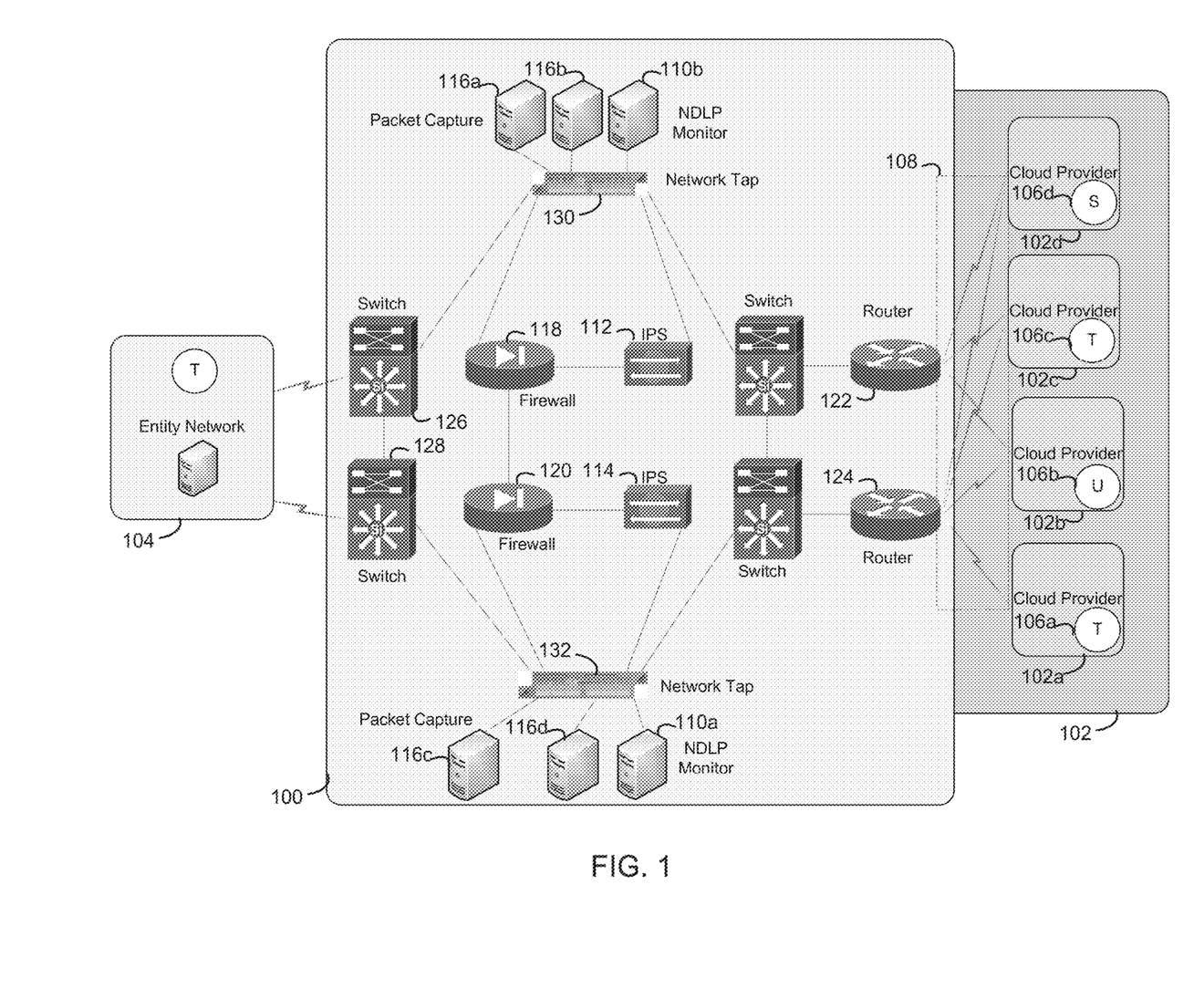
FIG. 1 depicts a cloud security stack, implemented in accordance with embodiments of the present invention.

In various implementations, a system for secure cloud provider communication may be provided. Referring now to FIG. 1, the system may include cloud security stack 100 to control passage of network traffic between cloud providers 102 (e.g., cloud providers 102*a*-102*d*) servicing entity network 104 and/or between cloud providers 102 and entity network 104. As shown in FIG. 1, in various implementations, cloud security stack 100 may include one or more of a router (e.g., routers 122 or 124), a switch (e.g., switches 126 or 128), a firewall (e.g., firewalls 118 or 120), an intrusion prevention system (e.g., IPSs 112 or 114), a network data loss prevention system (e.g., NDLPs 110*a* or 110*b*), a packet capture system (e.g., packet capture systems 116*a*-116*d*), and a network tap (e.g., network taps 130-132). One or more cloud providers 102*a*-102*d* may service or provide services to entity network 104.

Appropriate routing and security controls may be applied based on levels of trust (e.g., levels of trust (106*a*-106*d*) assigned to cloud providers 102 and entities (e.g., an entity controlling entity network 104). Cloud security stack 100 may include various network and security hardware and software. Cloud security stack 100 may also include one or more network data loss prevention (NDLP) systems or monitors (e.g., NDLPs 110*a* and 110*b*) to inspect network traffic 108, identify data, and prevent loss of data based on defined data loss prevention criteria. For example, various data loss prevention devices may be used to inspect traffic flowing between levels of trust through the cloud security stack. The data loss prevention devices may have the ability to alert and/or block certain data from being transferred through the cloud security stack using real-time packet analysis and a rule set built on one or more of the following platform rules and features.

Various machine learning tools such as vector machine learning may be used to learn and identify intellectual property, financial documents, source code, or other unstructured data that may difficult to describe. Various image recognition tools such as sensitive image recognition may be used to detect sensitive data which may be embedded in forms or other images (e.g., scanned documents, screenshots, and/or pictures) where built-in optical character recognition may be used. Data matching tools, such as exact data matching, may be used to identify sensitive data by fingerprinting structured databases for, e.g., customer names, bank account numbers, etc. Various document matching tools such as indexed document matching may be used to apply fingerprinting to documents to detect sensitive content that may be partially reused in other places such as in email messages. Various content matching tools, such as described content matching, may be used to look for matches on regular expressions or patterns such as social security numbers or credit card numbers and information. Various data classification tools may be used to identify files tagged as sensitive by users via various tagging features.

For instances where data in transit is encrypted, capability exists to securely decrypt traffic and alert and/or block data based on an identical ruleset as non-encrypted traffic. For example, encrypted network traffic may be temporarily decrypted for the purpose of payload inspection. In existing systems, encrypted traffic in transit may not be analyzed and malicious data in the payload or data loss may occur. This may cause damage to remote systems or a remote network in addition to corporate reputation based on data lost. One or more rulesets described in the present disclosure for the Intrusion Prevention/DLP technologies with decryption of the traffic/data may allow for the same or similar rulesets that are applied to clear text data in transit to be applied to the encrypted traffic.

The cloud security stack may further include one or more intrusion prevention systems (IPS) (e.g., IPSs 112 and 114) to inspect network traffic 108 and identify malicious activity based on defined intrusion prevention system criteria. IPSs 112 and/or 114 may inspect network traffic 108 inline for malicious activity and may take action to block or allow network traffic 108 based on a defined rule set.

Further, cloud security stack 100 may include one or more packet capture systems 116*a*-116*d* to capture and store a copy of network traffic 108. Packet capture systems 116*a*-116*d* may capture and store all traffic on an entity network to use for future analysis. Moreover, cloud security stack 100 may include firewall systems 118 and 120 to determine whether network traffic 108 should pass through cloud security stack 100 and to inspect network traffic 108 to ensure adherence to a network traffic protocol. Firewall systems 118 and 120 may allow or deny network traffic 108 based on a defined rule set.

For example, firewall rules may limit access to and/or from a connected cloud instance by denying access as a default, and allowing access only by exception, as a policy. Only new cloud connections between trusted entities may be allowed (i.e., by exception) and others denied until they may be vetted and opened via a risk and change control process. A robust security risk and compliance review (SRCR) may assess the risk that a particular IT application and/or system present to an entity. This may be based on various standards/policies of the entity. An approved SRCR may be a requirement for completion of a firewall rule request (FRR) that may permit communication between systems located in different levels of trust. By default, firewalls may be implemented in a deny all/allow by exception configuration. Once an FRR is approved, the firewall rules may be implemented via a change control that tracks firewall configuration modifications.

Also, firewall systems 118 and 120 may provide for stateful packet inspection of network traffic 108 to ensure adherence to any published protocols. Stateful packet inspection may be used to keep track of the state of TCP/UDP connections with the use of IP addresses, ports and sequence numbers. The firewall may only allow return traffic to flow in/out where the return traffic is already being tracked in a state table.

In various implementations, cloud security stack 100 may include one or more routers 122 and 124, one or more switches 126 and 128, and one or more network taps 130 and 132. The network taps 130 and 132 may provide an OSI Model Layer 1 extension of network traffic 108.

Figure 2:
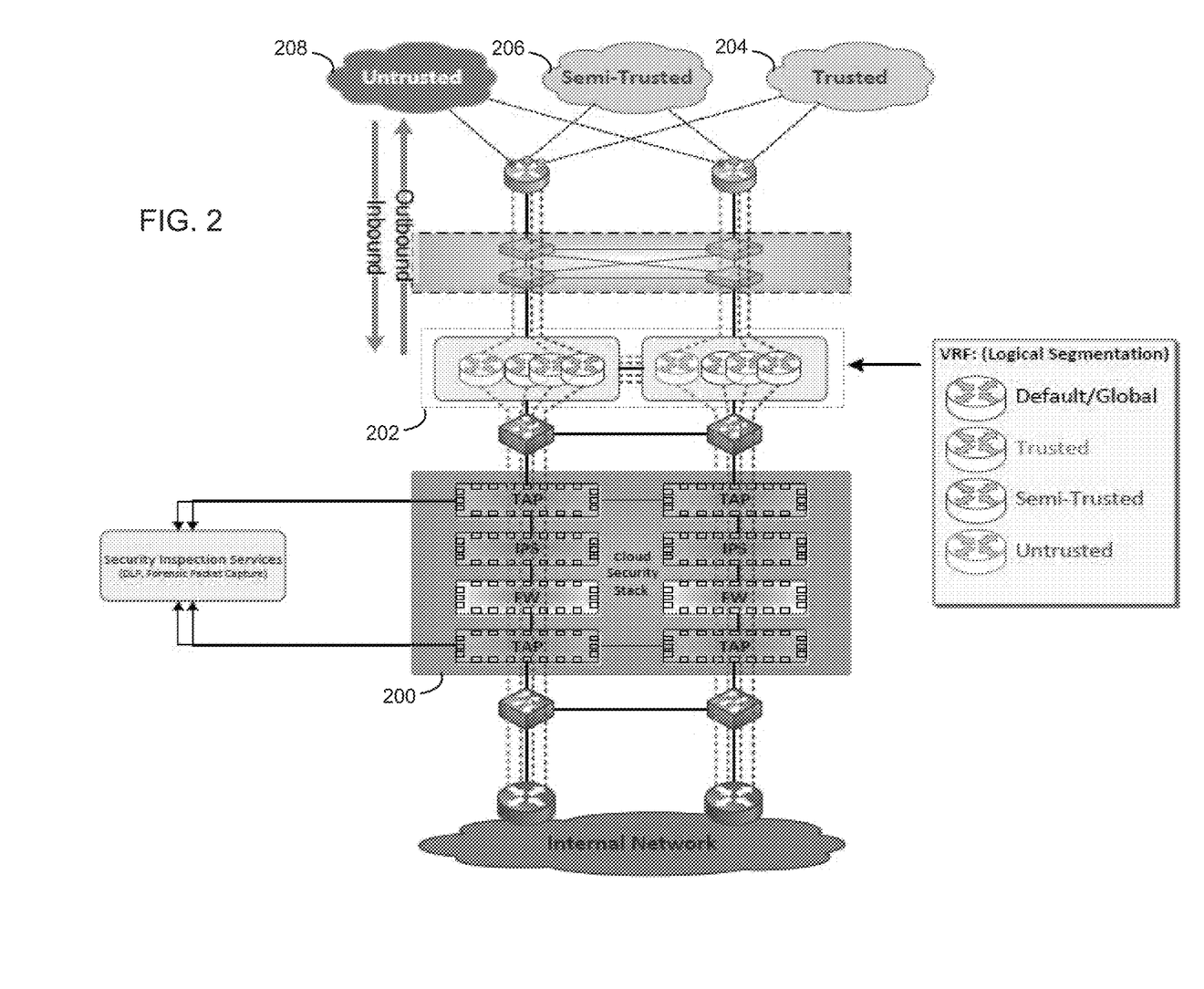
FIG. 2 depicts a cloud security stack, implemented in accordance with embodiments of the present invention.

Referring to FIG. 2, in various implementations, a cloud security stack 200 may include or be in communication with a virtual routing and forwarding (VRF) system 202 as shown in FIG. 2 to logically separate network traffic originating from trusted (e.g., cloud providers 204), semi-trusted (e.g., cloud provider 206), and untrusted (e.g., cloud provider 208) cloud providers. VRF system 202 may include a logical segmentation between default/global traffic, trusted traffic, semi-trusted traffic, and untrusted traffic. In various implementations, the techniques and features described herein may be used to logically separate traffic or data from different trust tiers (e.g., trusted, semi-trusted, and untrusted) until the traffic or data is forced to traverse the cloud security stack.

Network traffic may be separated in the cloud security stack through the use of VRFs and VLANs for Layer3 and Layer2 segmentation associated with dedicated physical and/or virtual network interfaces per instance. Each instance may represent a cloud provider with a given level of trust. For example, traffic that is designated as (from) cloud provider 1 may be given an interface that belongs to only that segment. Traffic from cloud provider 2, 3 etc. may all be setup in the same manner. This configuration may ensure that communication between each cloud provider, as well as on premise resources, is evaluated based on a ruleset approved given its classified trust level, denied by default and allowed by exception through the firewall.

In an implementation, in order for the traffic or data to pass from one trust zone to another trust zone, the traffic or data must pass through the cloud security stack (e.g., cloud security stack 100 or 200). The traffic or data may be logically separated from, e.g., a network of an entity that is a consumer of various cloud providers, until it goes through the cloud security stack. Once the traffic or data passes through the cloud security stack, it may be considered clean and be routed to or through the entity network (e.g., back to another trust tier and out through security controls in place for that trust tier, or somewhere internal to the entity network).

One or more of cloud providers 102a-102d may request to connect to cloud security stack 100 to transmit data to another cloud provider or an entity that is a consumer of the cloud provider (e.g., an entity that controls entity network 104). A list of information, which may include physical data and/or parameters describing various control options and specifications available with the cloud provider ("control information"), may be requested from one or more of cloud providers 102a-102d. A level of trust may be defined based on the control information received from the cloud provider and how the control information compares trust level criteria defined by the entity implementing the cloud security stack. For example, control information received from a cloud provider may indicate how much control a consumer of the cloud provider's services has over one or more endpoints of the cloud provider's network environment. Based on a defined level of trust for a cloud provider, appropriate security, routing, and controls may be applied for data to be transmitted to and from that cloud provider. The appropriate security, routing, and controls may be applied by using the cloud security stack or in some situations the cloud security stack may be bypassed. For example, if a first cloud provider (e.g., cloud provider 102a) and a second cloud provider (e.g., cloud provider 102c) are both defined as trusted based on, e.g., the physical data and/or parameters in the control information received, certain control may not be applied, and the first and second cloud providers (e.g., cloud providers 102a and 102c) may communicate without data flowing through cloud security stack 100. In this way, the techniques and features described herein may be used to define and control how cloud providers and entities having different levels of trust can communicate with each other.

Figure 3:
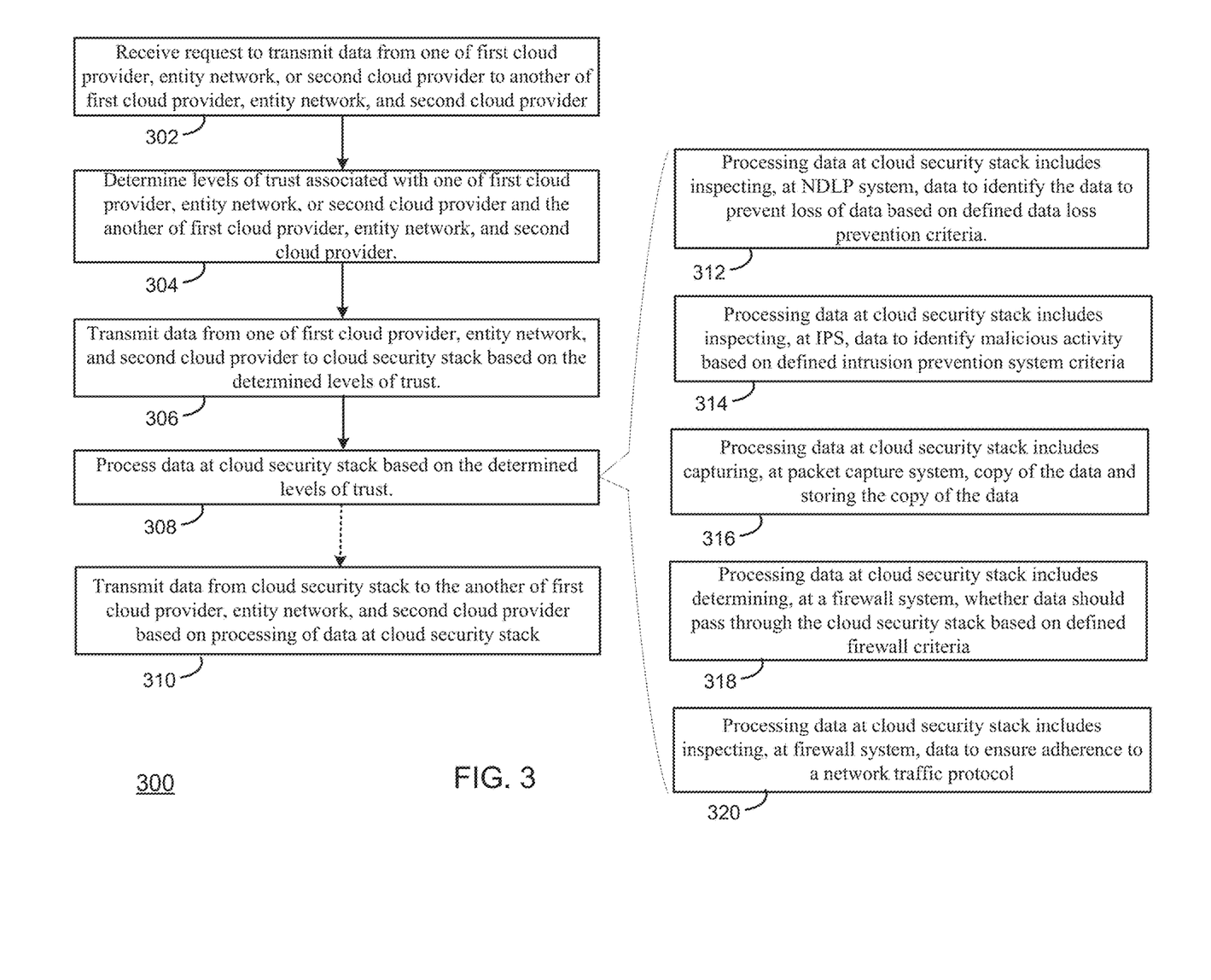
FIG. 3 depicts a flow chart of a method for providing secure cloud provider communication, in accordance with embodiments of the present invention.

Referring now also to FIG. 3, in various implementations, a method (300) for secure cloud provider communication may be provided. The method may include receiving (302) a request to transmit data from one of a first cloud provider (e.g., one of cloud providers 102a-102d), an entity network (e.g., entity network 104), and a second cloud provider (e.g., one of cloud providers 102a-102d) to another of the first cloud provider (e.g., one of cloud providers 102a-10\2d), the entity network (e.g., entity network 104), and the second cloud provider (e.g., one of cloud providers 102a-102d). The request may be received at one of routers 122 and 124 of cloud security stack 100.

The method may further include determining (304) levels of trust (106a-106d) associated with the one of the first cloud provider (e.g., one of cloud providers 102a-102d), the entity network (e.g., entity network 104), and the second cloud provider (e.g., one of cloud providers 102a-102d) and the another of the first cloud provider (e.g., one of cloud providers 102a-102d), the entity network (e.g., entity network 104), and the second cloud provider (e.g., one of cloud providers 102a-102d). The levels of trust (106a-106d) may be based on endpoint control by the entity network (e.g., entity network 104).

As discussed above, control information may be requested from and received from a cloud provider (e.g., electronically or via electronic communications or indications) to determine a level of trust to be assigned to the cloud provider. In an implementation, the process of receiving the control information from the cloud provider, assigning a level of trust, and handling network traffic from the cloud provider based on the control information provided may be automated. For example, the trust level and cloud security stack system may be automated using control information, which may be physical parameters and data, received from the cloud providers and trust level assignment may be performed automatically.

For example, determining levels of trust associated with the first cloud provider, the entity network, and the second cloud provider may include one or more of electronically transmitting a set of required control criteria to the first cloud provider and the second cloud provider, electronically receiving communications from to the first cloud provider and the second cloud provider, the communications indicating which of the required control criteria are met by the first cloud provider and the second cloud provider, electronically validating that the indicated required control criteria are met by the first cloud provider and the second cloud provider, and comparing the validated required control criteria for the first cloud provider and the second cloud provider with defined required control criteria for three different levels of trust;

In an implementation, an automated system for assigning a level of trust to a cloud provider may present a standard questionnaire to evaluate a new cloud provider. An automated computer implemented system or process may receive the answers of the questionnaire (e.g., control information) and perform a risk calculation based on input from the questionnaire combined with other data sets which may be collected automatically (from e.g., the Internet) for public cloud providers. The risk calculation to determine level of trust may be based upon a defined list of criteria, in addition to standards/policies of an entity that explain in detail what is required for each item listed. Some or all of this process may be automated by use of an internal application. In an implementation an IT administrator or someone from a security risk team may determines the level of trust given to a cloud provider. This level of trust may be determined by an assessment of the cloud provider's security controls and capabilities which may be tracked and processed using an SRCR and may be communicated by a prospecting service. The risk calculation may provide a risk value that may automatically present a trust value for cloud provider. The data sets used for the calculation may include public risk assessment data for the cloud provider, security certifications obtained by the cloud provider, physical and digital parameters for the cloud provider's locations, and any other data sets deemed applicable for a security assessment.

In an implementation, a security assertion markup language (SAML) or similar may be adapted for use in assessing cloud security capabilities. For example, a technical signal may indicate which security controls are in place for a certain cloud provider, and which party is responsible for the management of teach security control. SAML may pass defined attributes from an end system based upon pre-defined criteria (e.g., required control criteria) to a remote system. It may be used as a way to validate that certain controls are in place prior to allowing traffic between cloud security stack (CSS) connected networks. Having this type of information available, the entity network may predefine required controls and designate which party would be responsible for those controls, and the automated systems or methods for providing secure cloud provider communication may negotiate security relationships between the entity network and the cloud provider on the fly.

For example, a language may be implemented to communicate to a service prospecting for cloud services. A menu of available security controls offered by a cloud provider may be provided. The language may allow the prospecting service to interrogate potential cloud vender service offerings and may compare the available controls to its list of required controls for the data classification involved in the transaction. Price may be included as a variable included in the communication, and the prospecting service may negotiate price as it ensures that the proper security controls were implemented in the cloud provider.

In an implementation, an entity interested in implementing a cloud security stack (e.g., entity network 102) may assign each IaaS, PaaS, and/or SaaS cloud provider utilized by the entity network with a level of trust. The assignment of trust may be automated and levels of trust may be electronically assigned in response to receiving and electronically evaluating control information received from the cloud provider. In some situations, a risk or compliance team may determine a trust level for a cloud provider or set preferences in an electronic system to determine the trust level based on whether or not the cloud provider is able to meet defined controls criteria set by the entity implementing the cloud security stack.

In various implementations, the defined controls (e.g., required control criteria) that need to be met by the cloud provider may be one or more of logging controls, data leakage protection controls, secure communication controls, endpoint stack controls, authentication controls such as AuthN and AuthZ controls, Internet controls, network stack controls, resource controls, and/or soft controls. The control information about the cloud provider required by the entity implementing the cloud security stack in order to assign a trust level may include options, specifications and/or physical parameters related to one or more of these controls, including control information on one or more of the control types described below. The control information may be received by the entity implementing the cloud security stack electronically and may represent physical parameters and/or data that may be used to automatically assign a trust level and begin handling network traffic from the cloud provider. In order to be designated as a trusted cloud provider, the cloud provider may be required to meet one or more of the acceptable control type descriptions discussed below.

For example, logging control types may include network logs. The cloud service provider may be required to collect network traffic logs and other cloud services logs and make those logs available to the entity implementing the cloud security stack. The logging control types may further include physical server logs. The cloud service provider may be required to collect physical server and hypervisor logs and make those logs available to the entity implementing the cloud security stack. The logging control types may also include provisioning logs. The cloud service provider may be required to collect management, provisioning, and delivery logs and make those logs available to the entity implementing the cloud security stack. The logging control types may also include security information and event management (SIEM) integration. The cloud service provider may be required to collect security incidents and events logs in a SIEM system and make those incidents and events available to the entity implementing the cloud security stack. The logging control types may also include an application program interface (API) for SIEM. The cloud service provider may be required to allow for installation of, or provide an API interface for, the entity implementing the cloud security stack, in order to retrieve the SIEM log records for importation into a SIEM tool. The logging control types may also include application logging. The cloud service provider may also be required to collect application activity logs and make them available to the entity implementing the cloud security stack. The logging control types may also include virtual device logs. The cloud service provider may be required to collect virtual machine and virtual container logs and make those logs available to the entity implementing the cloud security stack (the "entity").

Further, data leakage protection (DLP) control types may include host based DLP. The cloud service provider may be required to allow for the entity's DLP client to be installed on a physical server or virtual machine of the cloud provider where applicable. DLP control types may also include network based DLP. The cloud service provider may be required to allow for the entity's network-based DLP to be installed between the cloud service provider and the entity's network.

Secure communications control types may include a secure communications path. The cloud service provider may be required to provide for the capability to leverage a dedicated circuit, a VPN (Virtual Private Network) tunnel, or another entity approved method for secure communications. Secure communications control types may also include IP address recognition. The cloud service provider may be required to provide for the ability to recognize and route network traffic based on the entity's source IP addresses. Secure communications control types may also include encrypted communication. The cloud service provider may be required to provide for the ability to force all web based connections to be encrypted via transport layer security TLS 1.1 or greater. Secure communications control types may also include RFC 1918 IP space. The cloud service provider may be requires to provide for the capability to use entity provided and approved IP address space for IaaS only.

Endpoint stack control types may include white listing. The cloud service provider may be required to allow for the entity's standard whitelisting product client to be installed on a physical server or virtual machine of the cloud provider where applicable. Endpoint stack control types may also include antivirus capability. The cloud service provider may be required to allow for the entity's standard antivirus client to be installed on a physical server or virtual machine of the cloud provider where applicable. Endpoint stack control types may also include Sureview capability. The cloud service provider may be required to allow for the entity's Sureview client to be installed on the host for incident response where applicable. Endpoint stack control types may also include Encase capability. The cloud service provider may be required to allow for the entity's Encase client to be installed on the host for incident response where applicable. Endpoint stack control types may also include Encryption at Rest capability. The cloud service provider may be required to provide encryption at rest that meets the entity's standards and that will allow utilization of the entity's Enterprise Encryption Key Management system. Endpoint stack control types may also include host-based intrusion prevention systems/detection (IPS/IDS). The cloud service provider may be required to allow for the entity's host-based (IPS/IDS) client to be installed on one or more virtual machine at the cloud provider where applicable. Endpoint stack control types may also include active directory. The cloud service provider may be required to allow for the ability for one or more virtual machines joined to the entity's cloud or network domain to be managed by Active Directory Group Policy Objects in IaaS only.

Authorization (AuthN and AuthZ) control types may include virtual machine membership. The cloud service provider may be required to allow for the ability to join one or more virtual machine of the cloud provider to the entity's cloud or network domain in IaaS only. Authorization control types may also include federation. The cloud service provider may be required to support Federated-SSO (Identity Federation) with the entity as the Identity Provider, and the cloud service provider as the Service Provider utilizing entity approved protocols.

Authorization control types may include administration account. The cloud service provider may be required to provide an entity security team with a super-user administration role with over-ride access to administer all accounts access. Authorization control types may include identity management. The cloud service provider may be required to allow for Identity Management either via Federated-SSO, or via an API. Authorization control types may include multi-factor for administration. The cloud service provider may be required to force multi-factor authentication for access to manage cloud infrastructure. Authorization control types may include limited administration access. The cloud service provider may be required to limit access to the cloud infrastructure management interface to specific sources.

Internet control types may include non-Internet-facing capability. The cloud service provider may be required to ensure that access to the cloud infrastructure management interface is not accessible via the Internet. Internet control types may include local Internet access. The cloud service provider may be required to ensure that access to the Internet is accessible from the cloud provided virtual machine system. Internet control types may include standard demilitarized zone (DMZ) or perimeter network practices. The cloud service provider may be required to ensure that access to the Internet from a cloud provided virtual machine is only accessible via an entity standard or approved DMZ.

Network stack control types may include firewall capabilities. The cloud service provider may be required to have firewalls implemented and provide to provide the entity the ability to manage the firewalls. Network stack control types may include packet capture review. The cloud service provider may be required to provide for the ability to collect packet capture traces and allow the entity's Incident Response team to view the collected traces during an incident. Network stack control types may include identification and control. All data going to a cloud environment which is leaving the entity may be required to go through a service to provide usage identification and encryption. Network stack control types may include intrusion prevention systems (IPS). The cloud service provider may be required to have network-based IPS implemented, and provide the entity the ability to manage the IPSs.

Resource control types may include image snapshot. The cloud service provider may be required to provide the entity with the ability to get virtual machine snapshots for forensic examination during an incident response event. Resource control types may also include isolation capabilities. The cloud service provider may be required to provide for physical isolation which may be preferred and logical isolation may be evaluated on a case by case basis per cloud provider. Resource control types may include resource management. The cloud service provider may be required to provide the entity with a secure API that may be used for scripting/programing that allows for the remote management of cloud resources. Resource control types may include operating system capabilities. The cloud service provider may be required to only install an entity approved operating system.

Soft controls control types may include follow-all-policies assurance. The cloud service provider may be required to ensure that they are following all of the entity's applicable policies. Soft controls control types may also include that the cloud service provider must work with their customer, and the entity's security team, to complete a risk evaluation for each implementation pattern. Soft controls control types may standard entity images/machines control. The cloud service provider may be required to allow the entity to use its standard entity images for virtual machines for IaaS only. Soft controls control types incident response controls. The cloud service provider may be required to provide documentation and demonstrate that their incident response procedures are in place. Soft controls control types may include breach notification. The cloud service provider may be required to provide the entity notification in the event of a breach as per a contract between the entity and the cloud service provider.

In various implementations, the method (300) for secure cloud provider communication may include designating the first cloud provider as having a first level of trust based on the comparing of the validated required control criteria to the defined required control criteria for the first cloud provider. The method (300) may also include designating the second cloud provider as having a second level of trust based on the comparing of the validated required control criteria to the defined required control criteria for the second cloud provider. In this way, the techniques and features described in the present disclosure may be used to determine and designate levels of trust of any number (e.g., 1000's) of cloud providers of other information technology providers.

Referring again to FIG. 3, the method (300) for secure cloud provider communication may also include transmitting (306) the data from the one of the first cloud provider (e.g., one of cloud providers 102a-102d), the entity network (e.g., entity network 104), and the second cloud provider (e.g., one of cloud providers 102a-102d) to a cloud security stack (e.g., cloud security stack 100 or 200) based on the determined (or designated) (304) levels of trust (106a-106d). The method may additionally include processing (308) the data at the cloud security stack (e.g., cloud security stack 100 or 200) based on the determined (or designated) (304) levels of trust. In various implementations, the method may include transmitting the data from the cloud security stack (e.g., cloud security stack 100 or 200) to the another of the first cloud provider (e.g., one of cloud providers 102a-102d), the entity network (e.g., entity network 104), and the second cloud provider (e.g., one of cloud providers 102a-102d) based on the processing (308) of the data at the cloud security stack (e.g., cloud security stack 100 or 200).

It should be noted that using the techniques and features described in the present disclosure, the first cloud provider, the entity network, and the second cloud provider may each designated as having a different level of trust and communicate securely with each other based on the different levels of trust designated and the processing of the data at the cloud security stack. Using the techniques and features described in the present disclosure any number of additional cloud providers or other information technology providers (e.g., 1000's) may communicate securely with each other based designated levels of trust and the processing of the data at the cloud security stack.

As discussed above, the entity implementing the cloud security stack may assign each cloud provider (e.g., an IaaS, PaaS and SaaS cloud provider) with a level of trust based the control information (e.g., physical parameters and data) received from each cloud provider and trust level criteria defined by the entity. The process of assigning a level of trust to each cloud provider may be automated, as discussed above. In an implementation, a risk and compliance team may determine a trust level for each cloud provider based on whether or not the cloud provider is able to meet trust level criteria defined by the entity implementing the cloud security stack. For example, a system may be used to track SRCR requests and to include new cloud providers that will be connected to the cloud security stack. The system may allow users to submit the required information and progress through stages to completion based upon input from a system administrator or risk expert.

For illustrative purposes only, three levels of trust may be referred to herein as trusted, semi-trusted, and untrusted. However, this is not intended to be a limitation of the present disclosure. Any number of trust levels may be used to implement methods for secure cloud provider communication and a cloud security stack, and the trust levels may correspond to a variety of levels of trust based on the control information received from the cloud provider.

For example, and referring back to FIG. 1, a cloud provider may be designated as trusted (most secure) if the cloud provider (106a, 106c) has an endpoint under control of the entity (i.e., the entity implementing the cloud security stack 100) that has met a series of controls that ensure the data present on the system is completely protected. The cloud provider may be designated as semi-trusted if the cloud provider (106d) has an endpoint partially under control of the entity (i.e., the entity implementing the cloud security stack 100) that has met a series of controls that ensure the data present on the system is reasonably protected. The cloud provider may be designated as untrusted (least secure) if the cloud provider (106b) has an endpoint not under any control of the entity (i.e., the entity implementing the cloud security stack) because it may be reasonable to believe any data on this system could be easily compromised.

Assume for example that entity network 104 needs the ability to communicate with cloud provider 102a. Because both entity network 104 and cloud provider 102a are classified as trusted (i.e., as noted in FIG. 1 with the "T"), traffic 108 may flow through cloud security stack 100 and which provides NDLP, IPS and packet capture abilities. Packet filtering may not be provided via the firewall (e.g., firewalls 118, 120) as both entity network 104 and cloud provider 102a are trusted.

In another example, assume that cloud provider 102a needs to communicate with cloud provider 102d. Traffic 108 may not be permitted to pass via the routers (e.g., routers 122, 124) to allow direct communication because traffic 108 may be required pass through cloud security stack 100 with all controls (i.e., NDLP, packet capture, IPS, and firewall packet filtering) applied, as traffic 108 is flowing from a trusted provider in cloud provider 102a to a semi-trusted provider in cloud provider 102d.

Further, in another example, assume that a server located at cloud provider 102a needs the ability to communicate with cloud provider 102c. Traffic 108 may not be permitted to pass via the routers (e.g., routers 122, 124) to allow direct communication, but may be required to pass through cloud security stack 100 with NDLP, IPS and packet capture controls. Packet filtering may not be provided via the firewall (e.g., firewalls 118, 120), as both providers are trusted.

Referring also to FIG. 3, processing (308) the data (e.g., network traffic 108) at cloud security stack 100 based on the determined (304) levels of trust may include inspecting (312), at a network data loss prevention system (e.g., NDLP 110a or 110b) of cloud security stack 100, the data to identify the data to prevent loss of the data based on defined data loss prevention criteria. Data loss prevention (DLP) criteria may be based on a pre-defined list of data types such as social security number, credit card number, tax ID, etc. Custom rules may be created based on alphanumeric and/or special characters in multiple languages. DLP rules may have two parts: conditions and actions. Conditions may be searched for within the data packet and actions may be performed once the condition is found. Data may be allowed, notified, and/or blocked from the data flow based on each rule.

Further, processing (308) the data (e.g., network traffic 108) at cloud security stack 100 based on the determined (304) levels of trust may also include inspecting (314), at an intrusion prevention system (e.g., IPS 112 or 114) of cloud security stack 100, the data to identify malicious activity based on defined intrusion prevention system criteria. Defined intrusion prevention system (IPS) criteria may be based on signature, anomaly, or protocol analysis. Signature criteria may be pre-determined and may use a database to compare the traffic. When a match is found, an appropriate defined action may be taken. Anomaly based detection may be performed after a baseline is determined and set on the IPS. If any activity deemed to be outside of these parameters, the appropriate defined action may be taken. Protocol analysis may identify and inspect traffic through the IPS systems based upon RFC standards for protocols and applications. As criteria may be pre-determined and use a database to compare the traffic, deviation from the RFC criteria may be detected and the appropriate defined action may be taken.

Processing (308) the data (e.g., network traffic 108) at cloud security stack 100 based on the determined (304) levels of trust may also include capturing (316), at a packet capture system (e.g., one or more of packet capture systems 116a-166d) of cloud security stack 100 a copy of the data and storing the copy of the data. Additionally, processing (308) the data (e.g., network traffic 108) at cloud security stack 100 based on the determined (304) levels of trust may include determining (318), at a firewall system (e.g., firewall systems 118 or 120) of cloud security stack 100, whether the data should pass through cloud security stack 100 based on defined firewall criteria. Moreover, processing (308) the data (e.g., network traffic 108) at cloud security stack 100 based on the determined (304) levels of trust may include inspecting (320), at a firewall system (e.g., firewall systems 118 or 120) of cloud security stack 100, the data to ensure adherence to a network traffic protocol.

It should be noted that traffic that flows through the cloud security stack may interact with each of the four security components (i.e., firewall, IPS, DLP, and packet capture). The firewall rules for trusted to trusted providers, as an example, may be in any configuration. In other words, traffic may be permitted between these two networks. Stateful packet inspection may still performed. Specific rulesets may be applied for DLP, IPS and packet capture for each connected entity.

As discussed above, in various implementations, the levels of trust based on endpoint control by entity network 104 may include a trusted level. The trusted level may indicate an endpoint (of a cloud provider) under control of entity network 104 meeting defined control criteria ensuring that the data is completely protected. The levels of trust based on endpoint control by entity network 104 may further include a semi-trusted level. The semi-trusted level may indicate an endpoint (of a cloud provider) under control of entity network 104 meeting defined control criteria ensuring that the data is partially protected. The levels of trust based on endpoint control by entity network 104 may also include an untrusted level. The untrusted level may indicate an endpoint (of a cloud provider) not under control of entity network 104 based on defined control criteria and indicate that the data unprotected.

The cloud security stack may include security appliances to provide layer 3 and 4 packet level security. The security appliances may be deployed in a high availability fashion with a single security appliance designated as the active node at all times. Redundant high availability security appliances may be placed in between the IPS and network devices that provide connectivity back to the implementing entity's data center core network, with a single security appliance designated as the active node at all times. The security appliances may be configured in a multiple context mode for future growth. A single firewall context may be configured initially and transparency may be used with the trusted (implementing network) side of the device as a default gateway.

The cloud security stack may be configured in a number of ways. For example, security appliances may be used to create a context needed for the cloud security stack. This approach may allow the physical firewall to be partitioned into multiple standalone firewalls for future growth. Each standalone firewall may act and behave as an independent entity with its own configuration, interfaces, security policies, and routing table. "Contexts" may be configured in order to take advantage of virtualization.

For example, an admin context may be created before defining other contexts and may reside on a local disk. A system context may be used to define different attributes of the other contexts. Layer 2 or 3 interfaces may not exist with the system context but it may define the interface allocations for other contexts. A customer context may act as a virtual firewall with its own configuration and may include options that are available in a standalone firewall. Access and event logs may be sent to SEIM.

Access Control lists on a security appliance may determine whether or not network traffic is allowed to flow from one defined network to another via a virtual or physical interface. Security levels (0-100) may be used to define each network. The higher the security level number, the more secure the network. By default, traffic flowing from a lower security level to a higher security level may be denied. Traffic that flows from a higher to a lower security level may be allowed.

Intrusion prevention devices (IPSs) may provide the network intrusion prevention for the cloud security stack. IPSs may be placed in between a untrusted side of the firewalls and the connectivity to the cloud providers. As the IPSs are in-line pass through devices, they may depend on layer 3 devices they are connected to for failover.

Using the techniques and features described herein, secure routing between, for example, a trusted IaaS cloud service provider and a semi-trusted or untrusted PaaS cloud service provider may be achieved by detecting and preventing intrusions across all points of connectivity through a cloud security stack. Further, the techniques and features describe herein may allow for enhanced visibility of potential loss of corporate and/or customer data across all points of connectivity through the cloud security stack.

Figure 4:
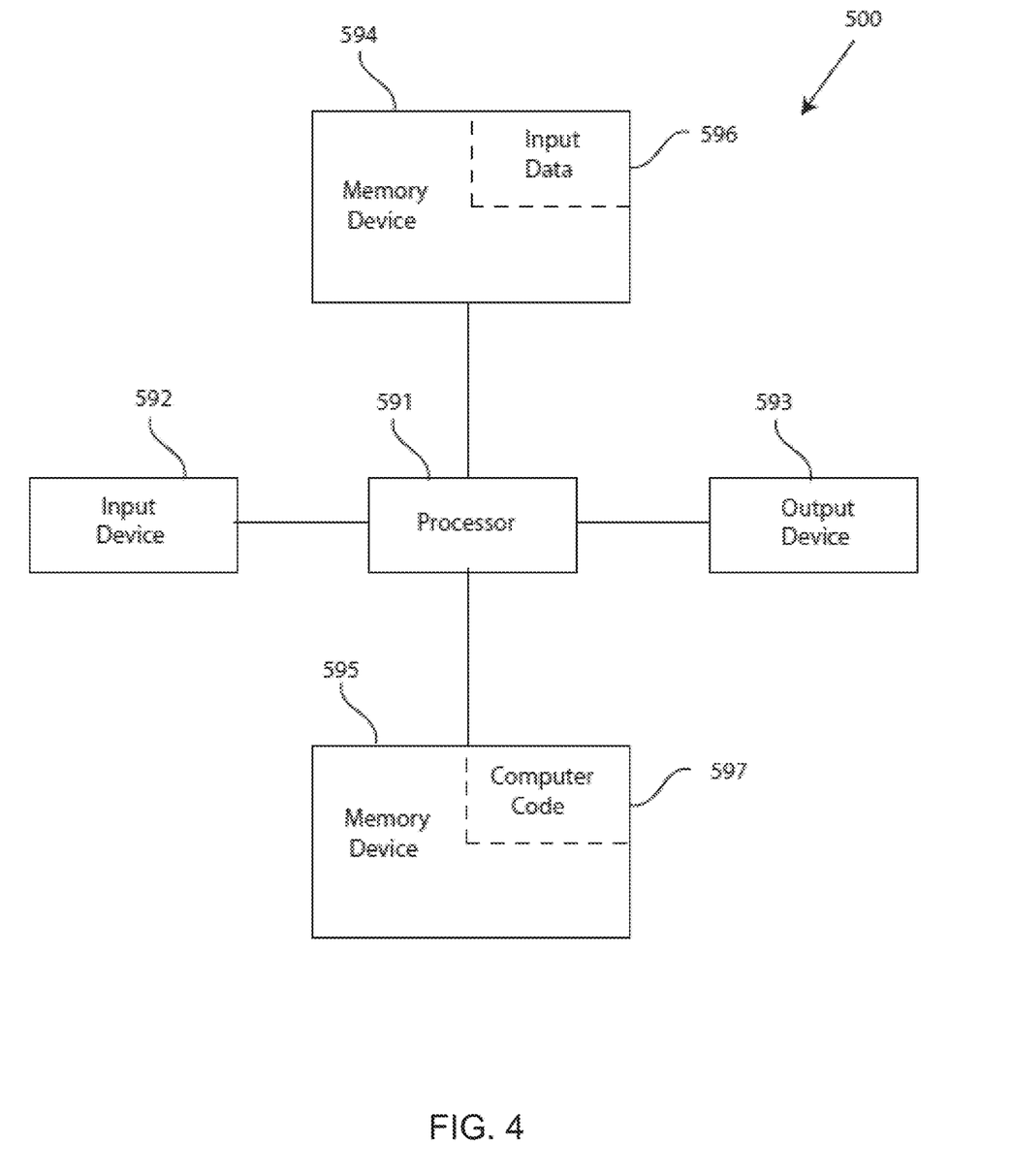
FIG. 4 illustrates a block diagram of a computer system for implementing various methods described in the present disclosure.

FIG. 4 illustrates a block diagram of a computer system capable of implementing methods for determining a level of trust to be assigned to a cloud provider and applying the level of trust using a cloud security stack, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer 500, including executing instructions included in the computer code 597 for the tools and programs capable of implementing methods for determining a level of trust to be assigned to a cloud provider and applying the level of trust using a cloud security stack, in the manner described in the present disclosure, wherein the instructions of the computer code 597 may be executed by processor 591 via memory device 595. The computer code 597 may include software or program instructions that may implement one or more algorithms for implementing the methods for determining a level of trust to be assigned to a cloud provider and applying the level of trust using a cloud security stack, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer readable program embodied therein and/or having other data stored therein, wherein the computer readable program comprises the computer code 597. Generally, a computer program product (or, alternatively, an article of manufacture) of the computer system 500 may comprise said computer usable storage medium (or said program storage device).

Memory devices 594, 595 include any known computer readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 6.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. or in some embodiments the input mechanism 110 or locking mechanism 111. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository.

As will be appreciated by one skilled in the art, in an embodiment, the present invention may be a method; in an embodiment, the present invention may be a system; and in an embodiment, the present invention may be a computer program product. Any of the components of the embodiments of the present invention can be deployed, managed, serviced, etc. by a service provider that offers to deploy or integrate computing infrastructure with respect to access controlling or regulating systems and methods. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer 500) including one or more processor(s) 591, wherein the processor(s) carry out instructions contained in the computer code 597 causing the computer system to control access to a locked space. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method for controlling access to a locked space. Thus, the present invention discloses a process for supporting, deploying and/or integrating computer infrastructure, integrating, hosting, maintaining, and deploying computer-readable code into the computer system 500, wherein the code in combination with the computer system 500 is capable of performing methods for determining a level of trust to be assigned to a cloud provider and applying the level of trust using a cloud security stack.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for secure cloud provider communication, the method comprising:

receiving at a cloud security stack a request to transmit data from one of a first cloud provider, an entity network, and a second cloud provider to another of the first cloud provider, the entity network, and the second cloud provider;

employing a cloud security stack to determine levels of trust associated with the first cloud provider, the entity network, and the second cloud provider, wherein determining the levels of trust comprises:
  electronically transmitting a set of required control criteria to the first cloud provider and the second cloud provider, wherein the required control criteria are at least one of data leakage protection controls, secure communication controls, endpoint stack controls, Internet controls, network stack controls, and resource controls;
  electronically receiving communications from the first cloud provider and the second cloud provider, the communications indicating which of the required control criteria are met by the first cloud provider and the second cloud provider;
  electronically validating that the indicated required control criteria are met by the first cloud provider and the second cloud provider; and
  comparing the validated required control criteria for the first cloud provider and the second cloud provider with defined required control criteria for three different levels of trust;
employing a cloud security stack to designate the first cloud provider as having a first level of trust based on the comparing of the validated required control criteria to the defined required control criteria for the first cloud provider;
employing a cloud security stack to designate the second cloud provider as having a second level of trust based on the comparing of the validated required control criteria to the defined required control criteria for the second cloud provider;
transmitting the data from the one of the first cloud provider, the entity network, and the second cloud provider to a cloud security stack based on the designated levels of trust;
processing the data at the cloud security stack based on the designated levels of trust by inspecting the data at a network data loss prevention system of the cloud security stack to prevent data loss based on defined data loss prevention criteria; and
transmitting the data from the cloud security stack to one of the first cloud provider, the entity network, and the second cloud provider based on the processing of the data at the cloud security stack,
wherein the first cloud provider, the entity network, and the second cloud provider are each designated as having a different level of trust and communicate securely with each other based on the different levels of trust designated and the processing of the data at the cloud security stack.

2. The method of claim 1, wherein the defined data loss prevention criteria includes conditions that are searched for within a data packet and action that are performed once the condition is found.

3. The method of claim 1, wherein processing the data at the cloud security stack based on the designated levels of trust comprises:
  inspecting, at an intrusion prevention system of the cloud security stack, the data to identify malicious activity based on defined intrusion prevention system criteria.

4. The method of claim 1, wherein processing the data at the cloud security stack based on the designated levels of trust comprises:
  capturing, at a packet capture system of the cloud security stack a copy of the data and storing the copy of the data.

5. The method of claim 1, wherein processing the data at the cloud security stack based on the designated levels of trust comprises:
  determining, at a firewall system of the cloud security stack, whether the data should pass through the cloud security stack based on defined firewall criteria.

6. The method of claim 1, wherein processing the data at the cloud security stack based on the designated levels of trust comprises:
  inspecting, at a firewall system of the cloud security stack, the data to ensure adherence to a network traffic protocol.

7. The method of claim 1, wherein the levels of trust are based on endpoint control by the entity network and include a trusted level, the trusted level indicating an endpoint under control of the entity network meeting defined control criteria ensuring that the data is completely protected.

8. The method of claim 1, wherein the levels of trust are based on endpoint control by the entity network and include a semi-trusted level, the semi-trusted level indicating an endpoint under control of the entity network meeting defined control criteria ensuring that the data is partially protected.

9. The method of claim 1, wherein the levels of trust are based on endpoint control by the entity network and include an untrusted level, the untrusted level indicating an endpoint not under control of the entity network based on defined control criteria and indicating that the data unprotected.

10. The method of claim 1, wherein the cloud security stack comprises a router, a switch, a firewall, an intrusion prevention system, a network data loss prevention system, a packet capture system, and a network tap.

11. The method of claim 1, wherein the first cloud provider and the second cloud provider service the entity network.

12. The method of claim 1, wherein the required control criteria comprises logging control.

13. The method of claim 1, wherein the logging control comprises one or more of network traffic logs, physical server logs, hypervisor logs, provisioning logs, management logs, and delivery logs.

14. The method of claim 1, wherein the network stack control controls at least one of a firewall, a packet capture review, and an identification and control device.

15. The method of claim 1, wherein the data leakage protection controls comprise at least one of a host-based DLP and a network-based DLP.

16. The method of claim 1, wherein the secure communication controls comprise at least one of a dedicated circuit, a Virtual Private Network (VPN) tunnel and IP address recognition.

17. The method of claim 1, wherein the endpoint stack controls comprise at least one of a white listing, antivirus capability, Sureview capability, Encase capability, Enterprise Encryption key management system; host-based intrusion prevention systems/detection (IPS/IDS) and Active Directory Group Policy Objects.

18. The method of claim 1, wherein the required control criteria further includes authorization controls comprising at least one of a Federated-SSO (Identity Federation) with the entity as an Identity Provider, and a multi-factor authentication for access to manage cloud.

19. A system for secure cloud provider communication, the system comprising:
  a cloud security stack to control passage of network traffic between cloud providers servicing an entity network and between the cloud providers and the entity network, the cloud security stack determines trusted, semi-trusted and untrusted cloud providers based upon required control criteria, wherein the required control criteria includes at least one of data leakage protection controls, secure communication controls, endpoint stack controls, Internet controls, network stack controls, and resource controls;

wherein the cloud security stack is configured to:
receive a request to transmit data from one of a first cloud provider, an entity network, and a second cloud provider to another of the first cloud provider, the entity network, and the second cloud provider,
employ a cloud security stack to determine levels of trust associated with the first cloud provider, the entity network, and the second cloud provider, wherein to determine the levels of trust the cloud security stack is configured to:
electronically transmit the required control criteria to the first cloud provider and the second cloud provider,
electronically receive communications from the first cloud provider and the second cloud provider, the communications indicating which of the required control criteria are met by the first cloud provider and the second cloud provider;
electronically validate that the indicated required control criteria are met by the first cloud provider and the second cloud provider; and
compare the validated required control criteria for the first cloud provider and the second cloud provider with defined required control criteria for three different levels of trust,
employ a cloud security stack to designate the first cloud provider as having a first level of trust based on the comparing of the validated required control criteria to the defined required control criteria for the first cloud provider;
employ a cloud security stack to designate the second cloud provider as having a second level of trust based on the comparing of the validated required control criteria to the defined required control criteria for the second cloud provider;
transmit the data from the one of the first cloud provider, the entity network, and the second cloud provider to a cloud security stack based on the designated levels of trust;
process the data at the cloud security stack based on the designated levels of trust by inspecting the data at a network data loss prevention system of the cloud security stack to prevent data loss based on defined data loss prevention criteria; and
transmit the data from the cloud security stack to one of the first cloud provider, the entity network, and the second cloud provider based on the processing of the data at the cloud security stack.

20. The system of claim 19, wherein the defined data loss prevention criteria includes conditions that are searched for within a data packet and actions that are performed once the condition is found.

* * * * *